Figure 1:
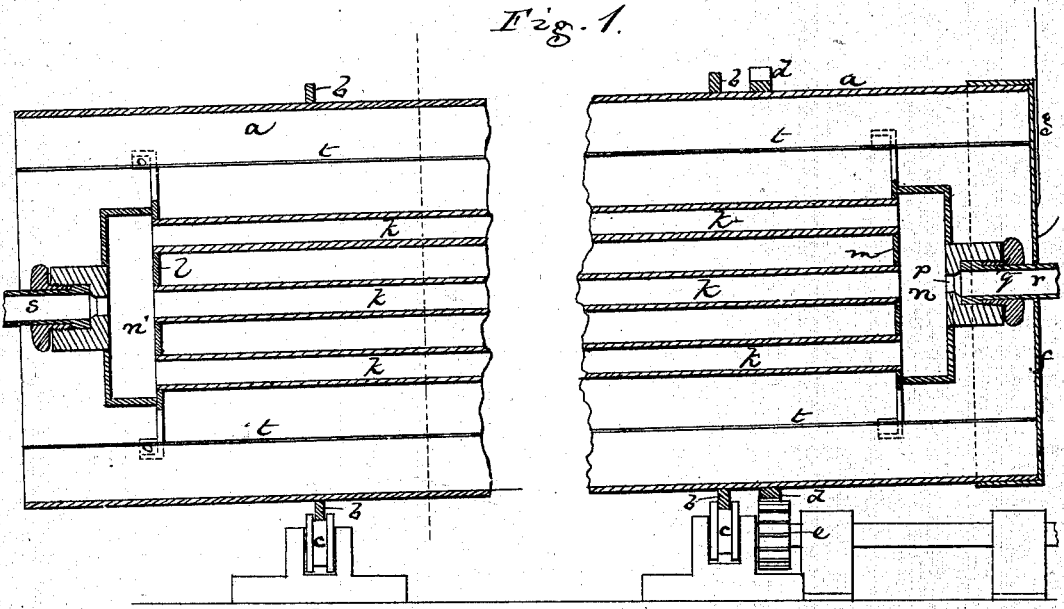

D. LEE.
Apparatus for Drying Sugar, Salt, &c.

No. 139,401. Patented May 27, 1873.

WITNESSES.
Mo. W. Frothingham.
L. H. Latimer.

INVENTOR.
Daniel Lee,
By his Attys.
Crosby & Gould.

UNITED STATES PATENT OFFICE.

DANIEL LEE, OF BOSTON, MASSACHUSETTS.

IMPROVEMENT IN APPARATUS FOR DRYING SUGAR, SALT, &c.

Specification forming part of Letters Patent No. 139,401, dated May 27, 1873; application filed April 16, 1873.

*To all whom it may concern:*

Be it known that I, DANIEL LEE, of Boston, in the county of Suffolk and State of Massachusetts, have invented an Improved Machine for Drying Sugar, Salt, &c.; and I do hereby declare that the following, taken in connection with the drawings which accompany and form part of this specification, is a description of my invention sufficient to enable those skilled in the art to practice it.

The invention relates to details of construction of a rotating apparatus particularly intended for drying or granulating sugar.

In my apparatus I use a main and approximately horizontal shell, or a cylinder open at one end, and having an air-escape passage at the opposite end, and through this cylinder I extend a series of steam-heated pipes parallel to the axis of rotation of the cylinder, said pipes extending from a head or steam-chamber near one end of the cylinder to a similar head or chamber near the opposite end of the cylinder, each chamber having an axial inlet or outlet into which extends a steam-pipe, the inlet-pipe being packed with reference to the cylinder-inlet, so that the cylinder can rotate with respect to said inlet-pipe. The steam inlet and outlet heads are connected to the inner surface of the shell by suitable ties or spokes, and the shell and steam-pipe rotate as one; and a current of air being induced through the cylinder, and the sugar being fed or delivered into the highest end of the cylinder, the air will be heated by contact with the steam-pipes, and the rotation of the shell will cause the sugar to drop from the shell to the pipes and from the pipes to the shell, and by the heat of the pipes, and by the absorbtion of moisture by the current of air heated by the pipes, the sugar will be rapidly deprived of its moisture, the sugar progressing forward as it continues to fall, until in a dry or granulated condition it emerges at the open end of the pipe, the air passing through the cylinder and off in an opposite direction.

The invention consists primarily in combining with the shell or open cylinder, through which a current of air is driven and the sugar moves, a series of steam-pipes for heating the air and the sugar, and so arranged as to receive the falling sugar directly upon them.

The drawing represents an apparatus embodying the invention.

Figure 2:
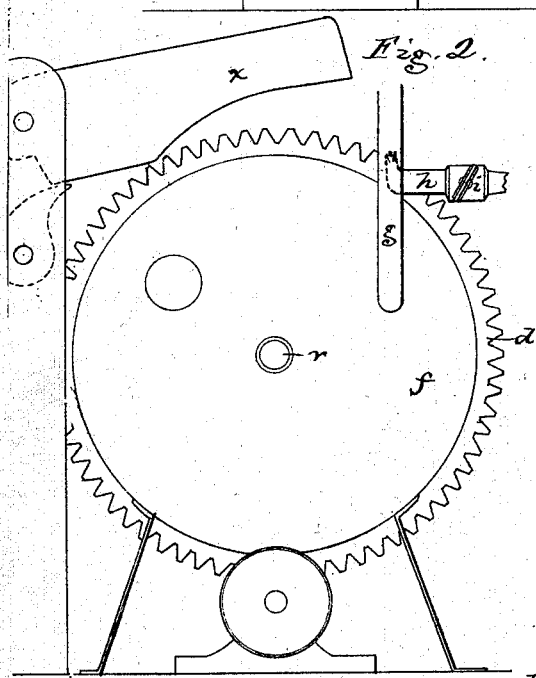
Figure 3:
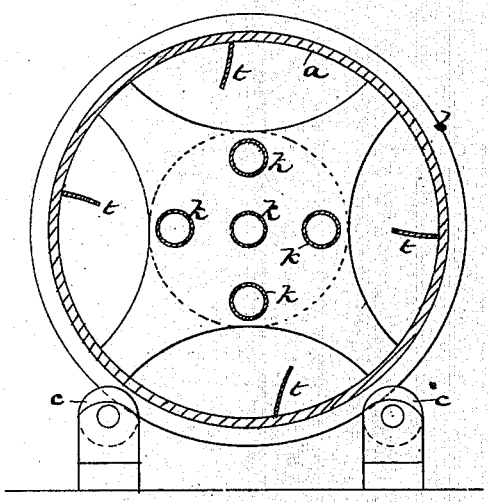
Figure 4:
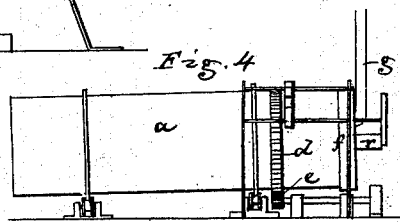

Figure 1 shows the apparatus in sectional elevation. Fig. 2 is an end view. Fig. 3 is a section in the line *x x*. Fig. 4 is a side elevation, reduced.

*a* denotes the shell or cylinder, having encompassing rims *b*, by means of which the cylinder is supported upon grooved or flanged rolls *c*, and rotates upon said rolls, rotation being effected by a gear-ring, *d*, and pinion *e*, as in some other driers, the rolls being so arranged as to incline the cylinder, as shown in Figs. 1 and 4. The lower end of the shell is open, and the upper end is closed by a stationary head, *f*, and the air circulates through the cylinder, entering its open end and escaping through a suitable pipe, *g*, its exit being preferably hastened and controlled by a steam-jet let into the pipe *g* through a connecting steam-pipe, *h*, said pipe *h* turning upward in the pipe *g* and having a cock, *i*, for controlling the jet of steam. Through the shell extend the heater or steam-pipes *k*, massed toward the center of the shell and running through two tube-sheets, *l m*, into hollow heads or chambers *n n'*, the tube-sheets being connected to the inner surface of the shells by the stays or spokes *o*. The steam-inlet head *n* has an axial passage, *p*, into which leads, through a suitable stuffing-box, *q*, the stationary steam-supply pipes *r*; and a steam-escape pipe, *s*, leads from a similar passage extending from the opposite head *n'*. Suitable lifters *t* serve to raise the sugar until it reaches a point from whence, by falling, it will lodge upon or fall between the pipes *k*, and the shell being rotated, the current of air being urged through it from its open end, the sugar being fed into its upper end through any suitable charging-passage, and the pipes being heated by the steam, the contact of the sugar with the surfaces of steam-pipes, and with the current of air heated by such pipes, will rapidly cause it to be deprived of all moisture without burning or discoloring it, it being discharged in a pure, white, dry, and granulated condition from the open end of the shell. A drop-hammer, x, raised by a suitable cam and dropping upon the surface of the cylinder as it rotates, will cause any sugar adhering to the inner surface of the shell to be dislodged therefrom.

For the tubes k I prefer to use common boiler tubes, and as these are made without joints I obviate the liability to leakage attending the use of a large steam-cylinder, instead of the independent tubes k.

I claim—

1. The rotary cylinder or shell a having extending through it the series of steam-pipes k, fixed with relation to the shell, and arranged and operating substantially as shown and described.

2. In combination with the shell a, and pipes k, the air-escape pipe g having the controlling steam-jet pipe h connected with it, substantially as shown and described.

DANIEL LEE.

Witnesses:
FRANCIS GOULD,
M. W. FROTHINGHAM.